July 3, 1962 G. DIRKS 3,042,906

STORAGE OF SIGNALS

Filed April 16, 1958 7 Sheets-Sheet 1

INVENTOR.
Gerhard Dirks

BY Michael S. Striker
Attorney

INVENTOR.
Gerhard Dirks
BY
Michael S. Striker
Attorney

INVENTOR.
Gerhard Dirks
BY
Richael S. Striker
Attorney

STORAGE OF SIGNALS

Filed April 16, 1958 7 Sheets-Sheet 4

INVENTOR.
Gerhard Dirks
BY
Michael S. Striker
Attorney

July 3, 1962 G. DIRKS 3,042,906

STORAGE OF SIGNALS

Filed April 16, 1958 7 Sheets-Sheet 5

INVENTOR.
Gerhard Dirks
BY
Michael S. Striker
Attorney

July 3, 1962 G. DIRKS 3,042,906

STORAGE OF SIGNALS

Filed April 16, 1958 7 Sheets-Sheet 6

INVENTOR.
Gerhard Dirks
BY
Michael S. Striker
Attorney

July 3, 1962 G. DIRKS 3,042,906

STORAGE OF SIGNALS

Filed April 16, 1958 7 Sheets-Sheet 7

INVENTOR.
Gerhard Dirks
BY
Michael S. Striker
Attorney

United States Patent Office 3,042,906 Patented July 3, 1962

3,042,906
STORAGE OF SIGNALS
Gerhard Dirks, 44 Morfelder Landstrasse, Frankfurt am Main, Germany
Filed Apr. 16, 1958, Ser. No. 728,812
5 Claims. (Cl. 340—174.1)

This invention relates to the selective storage of signals and to pulse generating apparatus for use with signal storages.

The present application is a continuation-in-part of my copending patent application Serial No. 645,824, filed March 13, 1957, entitled "Storage of Signals," now abandoned.

It is frequently necessary to generate individual pulses and pulse trains for control purposes when using signal storages with a plurality of signal storage locations. Such storages may take the form of magnetic drums, discs or tapes, for example. Various forms of storage are described in my British Patent No. 786,021 and my copending U.S. patent applications Nos. 498,047 and 498,048, both filed March 30, 1950. These pulses are normally generated in synchronism with the movement of the storage locations past a sensing and/or recording device and may be used for controlling sensing, recording and switching.

It is an object of the present invention to provide an improved pulse generating arrangement for use with a signal storage.

It is another object of the invention to provide a pulse generating arrangement utilizing a plurality of pulse generating elements the spacing of which is greater than the spacing of the signal storage locations for which they provide control pulses.

It is a further object of the invention to utilize such improved pulse generator for controlling recording of signals in the storage under control of a keyboard, or the like.

According to one feature of the invention a pulse generator, for use with a signal storage device, comprises a number of pulse generator elements equally spaced over a fixed distance, a different number of sensing devices for the elements equally spaced over the same distance, and means adapted to produce relative movement between the pulse generator elements and the sensing devices in a direction such that each element is sensed sequentially by each sensing device to generate a pulse.

According to a further feature of the invention a pulse generator, for use with a signal storage device, comprises a plurality of sensing devices lying in the same plane and being equally spaced over a predetermined distance, and a member carrying a plurality of equally spaced pulse generator elements and movable parallel to said plane to cause an element to generate a pulse in each sensing device in sequential order, an exact number of elements being contained within said predetermined distance, which number is different from the number of sensing devices arranged within the same distance.

According to another feature of the invention signal storage apparatus comprises a movable signal storage member with a plurality of signal storage locations equally spaced apart in the direction of movement, a plurality of equally spaced pulse generating elements, a plurality of equally spaced sensing devices for said elements and means adapted to produce relative movement between said elements and said sensing devices equal to the movement of the storage member, the spacing between adjacent elements and between adjacent sensing devices being different and being so related that an element is sensed for each movement of the storage device over a distance equal to the distance between adjacent storage locations.

The invention will now be described, by way of example, with reference to the accompanying drawings, in which.

Figure 1:
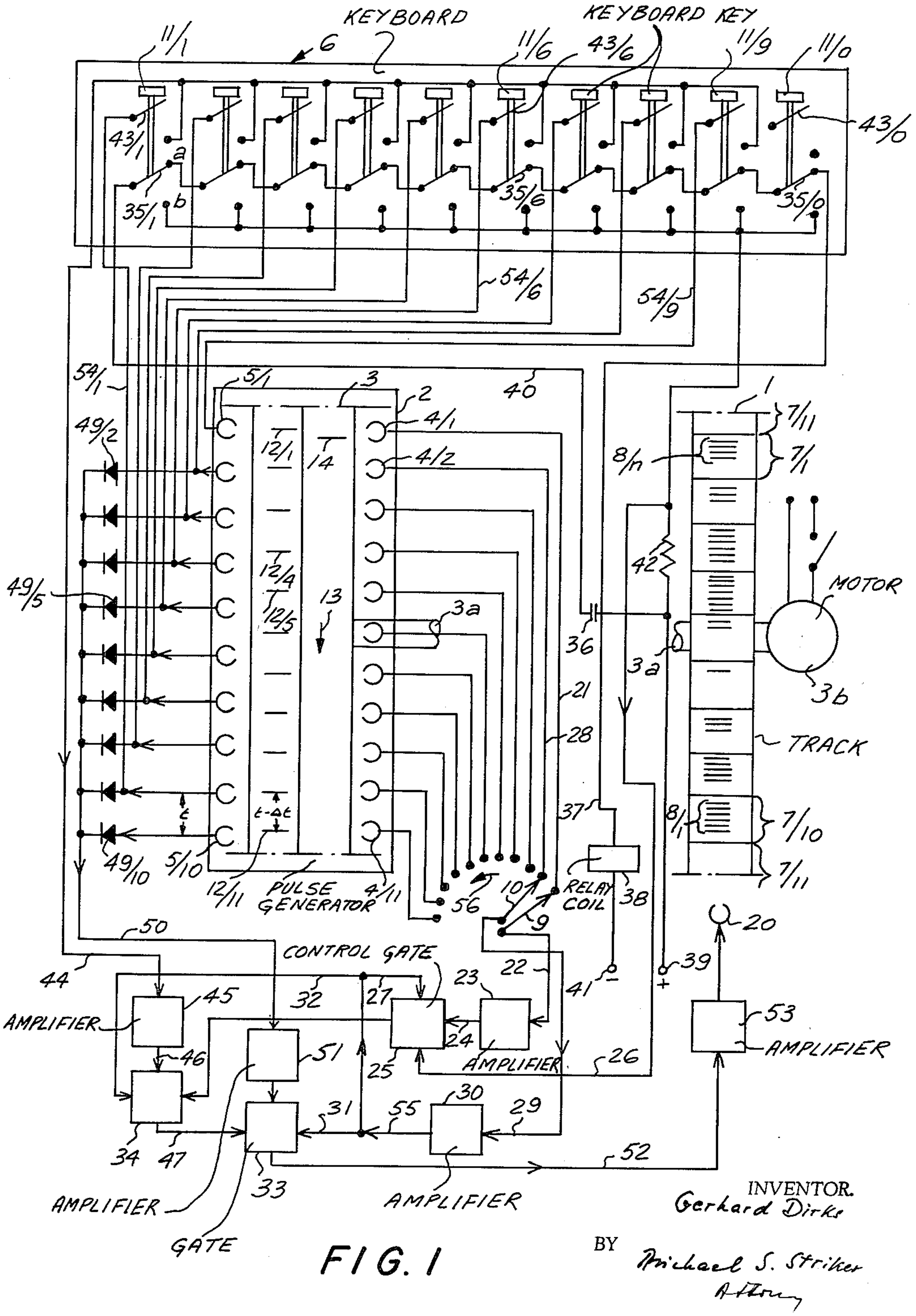
FIGURE 1 is a block schematic diagram of one embodiment of the invention.

All the embodiments shown in the drawings employ a magnetic drum signal storage device, into which numbers may be entered under control of a keyboard. The drum is divided into a plurality of storage tracks, each of which stores one multi-order number. Each track is divided into a plurality of storage areas, each of which corresponds to an order position and stores one digit located at the respective order position. In some cases one or more storage areas may be left blank to provide time for switching operations, such as track selection. Each storage area is again subdivided into a plurality of signal storage locations, in each of which a pulse may be recorded. A particular digit is represented by a number of pulses equal to the value of the digit, the pulses being recorded in the storage locations of the storage area associated with the order position of the digit.

Digits are recorded on the magnetic drum under control of a keyboard. Various control pulses are required for recording the pulses in the storage locations, selecting the storage area in which recording is to take place, etc. These pulses are generated by individual pulse generating elements which are driven in synchronism with the drum. These elements may be magnetically recorded signals, sections of magnetized material, photo-electrically sensible marks, etc.

The storage locations within the storage areas of a storage track may be relatively closely spaced and it may not be convenient, or practical, to provide pulse generating elements at the same spacing, particularly if these consist of magnetic inserts in a non-magnetic surface, for example. In the various forms of pulse generator shown in the drawings, a plurality of pulse generating elements are associated with a plurality of sensing devices, the relative spacing of the elements and the sensing devices being such that a pulse is generated for each signal storage location. This is achieved with a spacing between the elements which is considerably greater than the spacing between storage locations, for example, of the order of ten times greater.

The embodiment shown in FIGURE 1 employs a magnetic drum storage device which is mounted on a shaft $3a$ which is driven by a motor $3b$. A pulse generating device 2 is also mounted on the shaft $3a$. A part of one storage track of the magnetic storage drum is shown in developed form at 1. The track 1 is divided into a plurality of storage areas 7/1 to 7/11 of equal length. Each storage area is allocated to the recording of signals representing one digit and to one order position of a multi-order number.

In a similar way two tracks of the pulse generating device are shown in developed form at 3. One of the tracks contains a single pulse generating element in the form of a recorded signal 14 and the other track contains eleven pulse generating elements in the form of recorded signals 12/1 to 12/11. Each digit recorded in the data track 1 is represented by a corresponding number of pulses recorded in the signal storage locations of the storage area corresponding to the order position of the digit. For example, the digit 4 in the units order is represented by four pulses 8/*n* recorded in the storage area 7/1 and the digit 6 in the ninth order is represented by six pulses 8/1 recorded in the storage area 7/10.

The element 14 is sensed by magnetic sensing heads 4/1 to 4/11 and the resulting signals are used to determine in which storage area of track 1 recording takes place, under control of stepping switch 9, 10. The elements 12/1 to 12/11 are sensed by magnetic sensing heads 5/1 to 5/10, and the resulting signals are used to control recording of the digit value representing signals 8 within each storage area. It will be apparent from FIGURE 1 that the signals 8 are rather closely spaced compared with the elements 12/1 to 12/11 which control their recording. The heads 5/1 to 5/10 are equally spaced at a distance equal to *t*. The elements 12/1 to 12/11 are also equally spaced, but are separated by a smaller distance which is equal to $t-\Delta t$, where $\Delta t$ in the present embodiment is equal to *t* divided by 11.

With the pulse generator 2 rotating in arrow direction 13, the element 12/1 will be sensed by the head 5/1, and shortly thereafter the element 12/2 will be sensed by the head 5/2, and so on, so that when the surface of the pulse generator 2 has moved a distance equal to *t* each of the heads 5/1 to 5/10 will have sensed an element 12. The output signals from the heads, except the head 5/1, are fed in common to a lead 50 through isolating diodes 49/2 to 49/10, hence nine pulses will appear on the lead 50 during the movement of the surface of the pulse generator 2 through a distance equal to *t*.

Figure 2:
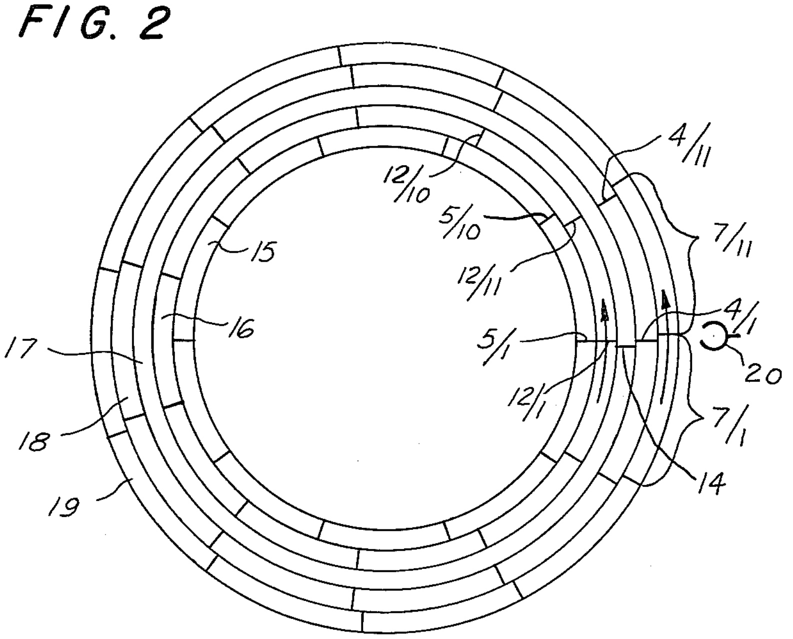
FIGURE 2 illustrates the relationship between the signal tracks shown in FIGURE 1.

The relative angular positions of the different storage areas in the track 1 and the recorded signals in the two tracks 3 together with the associated sensing heads is diagrammatically illustrated in FIGURE 2. These various positions are indicated by marks within concentric rings. The marks within the rings 15, 16, 17, 18 and 19 indicate, respectively, the heads 5, the elements 12, the element 14, the heads 4 and the storage areas 7. It will be seen that the angle subtended by a storage area 7 is equal to that subtended by the spacings between adjacent elements 12 and by the spacings between adjacent heads 4. On the other hand, a larger angle is subtended by the spacings between adjacent heads 5, since there are only ten heads within the ring 15 as compared with eleven storage areas 7 in ring 19. It will be apparent from FIGURE 2 that, when one of the storage areas passes an associated recording head 20, each of the elements 12 will pass the associated one of the heads 5.

The arrangement of adjacent sensing heads 5 at a distance *t* apart, whereas adjacent elements 12 are a distance $t-\Delta t$ apart, allows the elements 12 to be spaced approximately ten times as far apart as the distance between adjacent storage locations in which are recorded the one or more of the individual signals 8. Since the spacing between the signals 12 is relatively large the pulse generator 2 may, in fact, consist of a drum of non-magnetic material which is slotted at positions corresponding to the positions of the elements 12, small strips of magnetized material being inserted in the slots. Such an arrangement provides a signal output from the sensing heads 5 which is quite strong as compared with that produced by a signal recorded on the normal magnetic oxide layer, which is conventionally used on magnetic storage drums. Alternatively, the elements 12 may be in the form of black marks on a white background, or metallized areas on a non-conducting surface, the heads 5 being replaced by photo-electric cells or metal pick-up plates which detect the change in the light reflecting properties or the capacity, respectively, between said metal areas and plates as the pulse generator drum 2 rotates.

The digits to be recorded in the storage areas 7 are set up one at a time on a keyboard 6, which has ten keys 11/1 to 11/0. Each key controls a pair of contacts 35 and 43. In the rest position of the keys, a capacitor 36 is connected from positive supply 39 through the chain of contacts 35 in the *a* position, a lead 37 and the winding of a relay 38 to negative supply 41. Hence the capacitor is charged. It will be assumed that the units digit 6 is to be entered by depressing the key 11/6. The contact 35/6 in the *b* position will then connect the capacitor 36 across a resistor 42, through which the capacitor will discharge. This produces a pulse on a lead 26, which is applied to a control gate 25 to switch it on. The sensing head 4/1 is connected via lead 21, the switch arm 9, lead 22, amplifier 23 and lead 24 to the input of the gate 25. Hence, when the head 4/1 senses the element 14, after the gate 25 has been opened by the depression of the key 11/6, a signal is passed by the gate 25 to switch on a control gate 34.

The sensing head 5/4 is connected through lead 54/6, the then closed contact 43/6 and lead 44 to the input of an amplifier 45. The output of the amplifier 45 is connected, via lead 46, to the input of the gate 34. When the head 5/4 senses one of the elements 12, after the gate 34 has been opened in the manner described, a pulse is fed through the gate 34, via lead 47, to switch on the gate 33. The gate 33 receives an input from an amplifier 51, which is fed by the lead 50, which receives pulses from the sensing heads 5/2 to 5/10. Hence the gate 33 will pass the pulses generated by the heads 5/5 to 5/10, that is six pulses, and these pulses will be passed, via lead 52 and an amplifier 53, to the recording head 20 associated with the storage track 1. The heads 5 generate signals sequentially, in the order 5/1 to 5/10. The signals from the heads 5/1 to 5/4 will be applied to the gate 33, through amplifier 51 but they will not be passed by the gate, which is closed until the signal from the head 5/4 is applied to it through the gate 34.

It will be apparent from FIGURE 2, that the head 4/1 senses the element 14 at the same time as the beginning of the storage area 7/1 is passing the recording head 20. Hence the six pulses passed by the gate 33 to the recording head 20 will cause recording of six signals 8 in the storage locations of the storage area 7/1. Thus, the first input digit has been recorded in the appropriate storage area.

Since the heads 4/1 and 4/2 are spaced apart by a distance equal to the length of a storage area, the element 14 will be sensed by the head 4/2 after recording of the signals 8/*n* in the storage area 7/1 has been completed. This produces a signal which is fed via lead 28, switch arm 10 and lead 29 to an amplifier 30. The amplifier 30 produces an output pulse on lead 55 which is applied via leads 27, 31 and 32 to the gates 25, 33 and 34 respectively to switch these gates off.

When the key 11/6 is released, the contact 35/6 returns to the *a* position and completes the series circuit for charging the capacitor 36, which was discharged when the key 11/6 was depressed. This charging current passes through the winding of the relay 38. Energization of the relay 38 operates the arms 9 and 10 of the stepping switch to shift each of them in the direction of arrow 56 by one step.

The next time that one of the keys 11 is depressed, the sensing head 4/2 will be made operative by the position of the switching arm 9 to switch on the gate 25, and the sensing head 4/3 will be operative through the switching arm 10 to switch off the gates 25, 33 and 34 on completion of the recording of the digit represented by the depressed key. Since recording is initiated by the sensing of the element 14 by the sensing head 4/2, the recording of the digit value will take place in the storage area 7/2.

Figure 3:
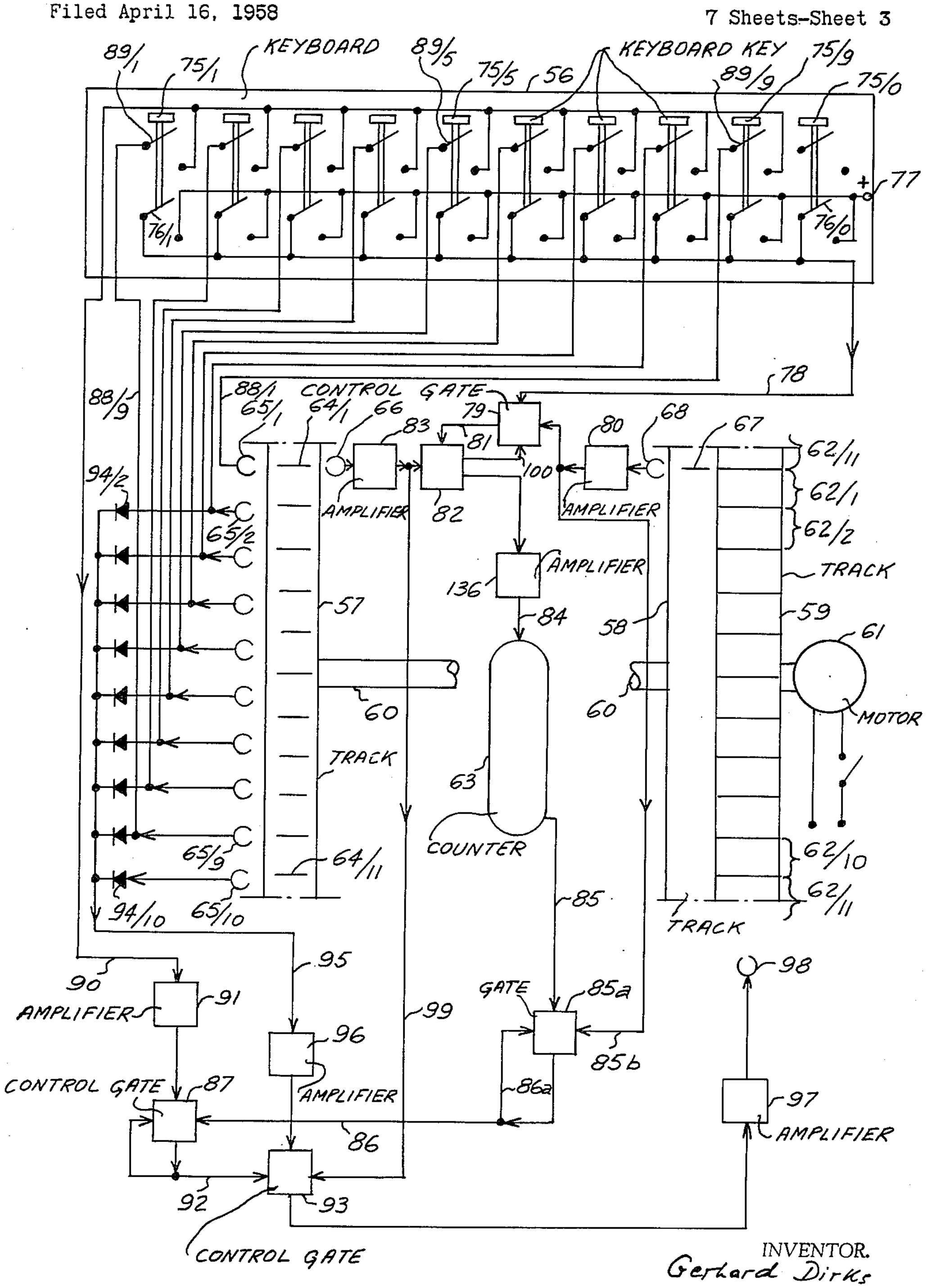
FIGURE 3 is a block schematic diagram of a second embodiment of the invention.

A second embodiment is shown in FIGURE 3. This differs primarily from the embodiment shown in FIG- URE 1 in that a counter 63 is used to control the selection of the storage area in which recording is to take place, instead of the heads 4/1 to 4/11 and the stepping switch 9, 10 of FIGURE 1.

The magnetic storage drum and pulse generator are mounted on a shaft 60 which is driven by a motor 61. A development of one track of the storage drum is shown at 59. This track is divided into storage areas 62/1 to 62/11. The storage areas 62/1 to 62/10 are utilized for the recording of digit values in the same manner as the storage areas 7 of FIGURE 1. The storage area 62/11 is always left blank, so that during the period when this storage area is passing beneath an associated recording head 98, various switching and control functions may be performed.

Figure 4:
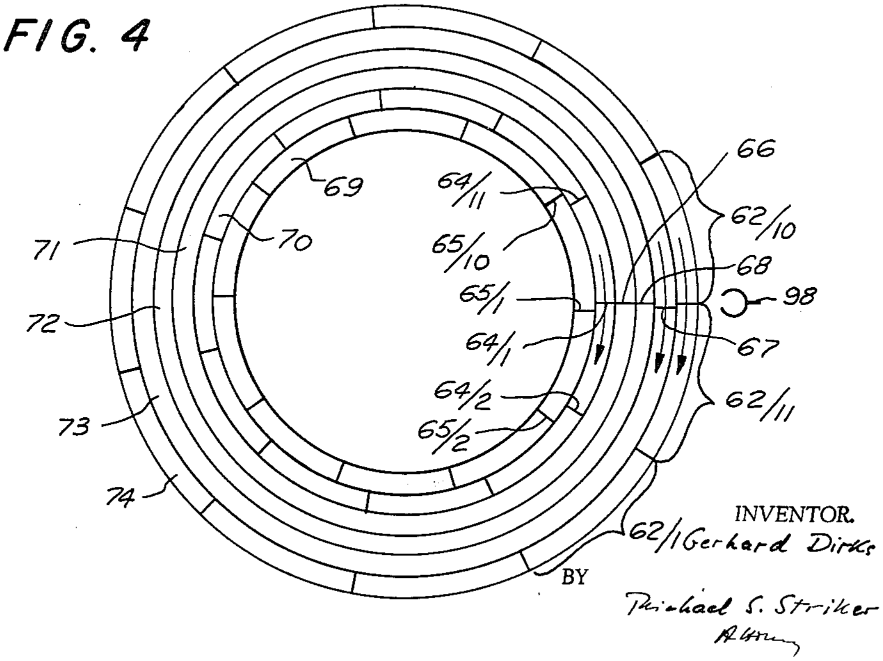
FIGURE 4 illustrates the relationship of the signal tracks shown in FIGURE 3.

One track of the pulse generator is shown developed at 57. This track contains pulse generator elements 64/1 to 64/11, which are sensed by associated heads 65/1 to 65/10. These elements and heads correspond to the elements 12/1 to 12/11 and to the heads 5/1 to 5/10 of FIGURE 1. The elements 64 are also sensed by a sensing head 66 which operates an amplifier 83. The relative positions of the various recorded signals and the related magnetic heads is shown in FIGURE 4, using the same conventions as in FIGURE 2. The marks within the rings 69, 70, 71, 72, 73 and 74 correspond respectively to the heads 65, the elements 64, the head 66, a head 68, an element 67 and storage areas 62.

The recording of digit values in the track 59 is controlled by a keyboard 56 which has ten keys 75/1 to 75/0. Each key controls a pair of contacts 76 and 89. It will be assumed that the units digit five is to be recorded in the track 59, so that the key 75/5 is depressed. The contact 76/5 closes and provides a circuit from positive source 77, via lead 78, to a control gate 79, which is thereby switched on.

Another track 58 on the magnetic drum has a single element 67, which is equivalent to the element 14 of FIGURE 1. This element 67 is sensed by a head 68, which feeds an amplifier 80. The output of the amplifier 80 is fed to the gate 79. Hence, the first time that the element 67 is sensed after the gate has been opened by depression of the key 75/5, the gate 79 will pass a signal over lead 81 to switch on a control gate 82.

As will be seen from FIGURE 4, the head 68 sensed the element 67 just prior to the sensing of the element 64/1 by the head 66. Therefore, the signals produced by the sensing of the element 64/1, and subsequent elements, by the head 66 will be fed through the amplifier 83, the gate 82, amplifier 136 and lead 84 to the decade counter 63. When ten of these pulses have been fed to the counter 63, a carry pulse will be produced on lead 85. The carry pulse is fed via lead 86 to switch on a control gate 87.

The gate 87 controls the generation of the correct number of digit pulses in accordance with the particular key of the keyboard 56 which was depressed, so that it corresponds to the gate 34 of FIGURE 1. Pulses generated by the sensing head 65/5 are fed to the gate 87, as long as the key 75/5 is depressed, by a circuit through the contact 89/5, lead 90 and amplifier 91. The next pulse generated by the head 65/5 after the gate 87 has been opened by a carry pulse from the counter 63 will pass through the gate 87 and, via lead 92, to control gate 93, which will be switched on by this pulse. The pulse is also fed back to the control gate 87 to switch it off. The sensing heads 65/2 to 65/10 are connected in common to lead 95, via isolating diodes 94/2 to 94/10. The lead 95 is connected to the input of an amplifier 96 which feeds the input of the control gate 93. Hence the gate 93 corresponds to the gate 33 of FIGURE 1. Since the gate 93 was switched on by a pulse from the sensing head 65/5, the gate will pass the following pulses from the heads 65/6 to 65/10, so that five pulses will be fed via amplifier 97 to the recording head 98. Shortly after this, one of the elements 64 is sensed by the head 66 and the resulting output from the amplifier 83 is fed, via lead 99, to the gate 93 to switch it off, so preventing any further recording.

It will be seen from FIGURE 4 that the carry pulse from the counter 63, resulting from ten pulses from the head 66, is produced at the same time as the beginning of storage area 62/1 is passing the recording head 98, hence the five pulses passed by the gate 93 will be recorded in the sector 62/1, and the pulse on the lead 99 will terminate the recording at the end of this storage area. The gate 93 cannot be switched on again during this revolution because the gate 87 was switched off.

The carry pulse on lead 85 is also applied to a gate 85*a* to switch it on. The next time that a pulse is produced by the amplifier 80 in response to the sensing of the element 67, this pulse is passed by the gate 85*a* which is now open and is applied to the gate 82 to switch it off. Hence the gate 82 is opened for one revolution of the storage drum each time a key 75 is depressed. The same pulse is also fed back via a lead 86*a* to the gate 85*a* to switch it off. The pulse which passes through the gate 85*a* does not pass through the gate 79 since this has already been switched off by a pulse, applied to it over lead 100, which resulted from the switching on of the gate 82 by the pulse passed by the gate 79.

It will be seen from FIGURE 4 that the elements 64 and the related heads 65 are staggered in a similar way to that employed in the pulse generator of FIGURE 1. The element 67 may be in a track on the pulse generator, rather than on the storage drum, if desired.

Each time the gate 82 is opened for one revolution in response to the depression of one of the keys 75, eleven pulses are fed to the counter 63. Since this is a decade counter, after the first digit has been entered the counter will be left registering unity and, the next time a key 75 is depressed, the carry pulse from the counter will occur one pulse time earlier. The carry pulse will therefore open the gate 93 when the storage area 62/2 is about to pass the head 98.

The counter 63 will be registering two after the recording of the second digit, so that the digit represented by the third key depression will be recorded in area 62/3, and so on for the successive key depressions.

Figure 5:
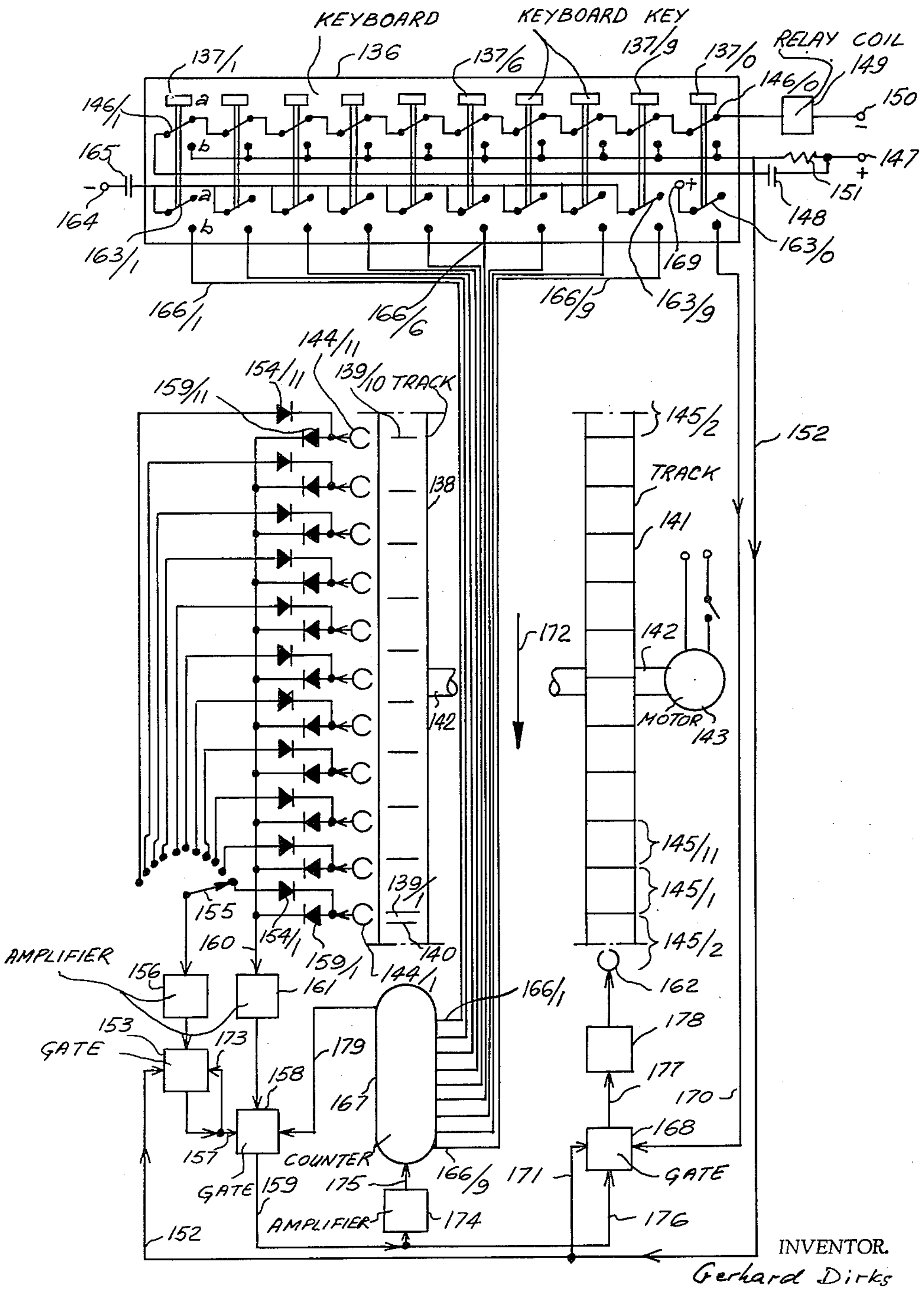
FIGURE 5 is a block schematic diagram of a third embodiment of the invention.

A third embodiment is shown in FIGURE 5. Digits are entered one at a time by means of a keyboard 136, with keys 137/1 to 137/0. A stepping switch 155 controls the selection of the sector in which a particular digit is to be recorded in a manner generally similar to that described in connection with FIGURE 1. However, the control of the number of pulses to be recorded in the storage track under control of a set key is obtained by means of a counter 167.

Figure 6:
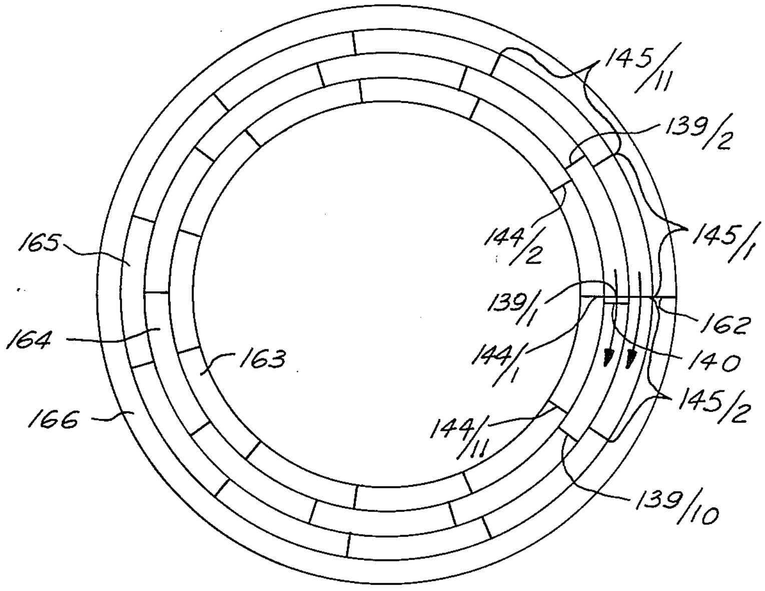
FIGURE 6 illustrates the relationship of the signal tracks shown in FIGURE 5.

FIGURE 6 illustrates diagrammatically, in a manner exactly corresponding to FIGURES 2 and 4, the relative positions of the heads 144, 162, storage areas 145, and elements 139, 140 in rings 163—166.

The data is recorded on a magnetic drum storage device which is secured to a shaft 142 which is driven by a motor 143. One track is shown in developed form at 141. It is divided into eleven storage areas 145/1 to 145/11. A pulse generator which is mounted on the same shaft as the magnetic drum has a single track only, which is shown in developed from at 138. The track contains elements 139/1 to 139/10 which correspond to the elements 12/1 to 12/11 of FIGURE 1. The track 138 also contains an element 140 which corresponds to the element 14 of FIGURE 1. The elements 139 and 140 are sensed by heads 144/1 to 144/11. In contrast to the first two embodiments, there are eleven heads equally spaced in the distance occupied by ten of the equally spaced elements 139.

In the rest position of the keys 137, a capacitor 148 is connected from a positive supply 147, through a chain of contacts 146/1 to 146/0 in the *a* position, and a relay coil 149 to negative supply 150. On depression of key 137/6, for example, contact 146/6 is shifted to the *b* position, which connects the capacitor 148 across a resistor 151, through which it discharges. This produces a pulse on a lead 152 which is connected to a gate 153, which is switched on by the pulse.

All the heads 144 are connected through diodes 159/1 to 159/11 to a common line 160, which is connected to the input of an amplifier 161. The diodes 159/1 to 159/11 are so poled that they pass only positive pulses from the heads 144 to the amplifier 161. The heads 144 are also connected through diodes 154/1 to 154/11 to the individual contacts of the stepping switch 155. The diodes 154 are so poled that they pass only negative pulses from the heads 144. The elements 139 and 140 are such that they produce positive and negative pulses, respectively, in the heads 144. Preferably the elements comprise magnetized inserts in a non-magnetic drum. The part of the inserts 139 which cooperates with the heads 144 is of one magnetic polarity and the corresponding part of the insert 140 is of the opposite magnetic polarity.

When the units digit is to be recorded, the stepping switch 155 is in the position shown. This allows the signals induced in the head 144/1 by the element 140 to be fed through diode 154/1, the switch 155, amplifier 156 to gate 153. One of these signals will be fed via a lead 157, to switch on a gate 158, after the gate 153 has been opened by the pulse on the line 152 produced by depression of the key 137/6.

The positive signals produced in the heads 144/1 to 144/11 by the elements 139 are fed via the diodes 159, lead 160 and amplifier 161 to the input of the gate 158. These signals are passed by the gate 158, after it has been switched on by the signal from the gate 153, and are fed via an amplifier 174 and lead 175 to the input of a decade counter 167. The counter 167 comprises a multi-cathode gas-filled discharge tube, the cathodes of which representing the value "9" to "1," are connected through leads 166/1 to 166/9 respectively, to the *b* terminal of contacts 163/1 to 163/9, which are operated by the keys 137. The depression of the key 137/6 completes a circuit from negative supply 164, through capacitor 165, contacts 136/6, and lead 166/6 to the "4" value cathode of the counting tube. The leads 166 are each connected to the cathode of complementary value, that is the lead 166/1 is connected to the "9" value cathode and the lead 166/9 to the "1" value cathode, and so on.

The circuit completed by the contact 163/6 applies a negative pulse to the "4" value cathode, which causes the discharge to locate itself on this cathode. When the gate 158 is switched on, the output pulses from it step the discharge in the counting tube 167 from the "4" value cathode to the "5" value cathode, the "6" value cathode, etc., in succession. The same pulses are also applied to the input of a gate 168 which was switched on when the key 137/6 was depressed. This was effected by the pulse on the line 152 which was applied to the gate 168 over lead 171. Hence these pulses from the gate 158 are passed by the gate 168, and are fed, via lead 177 and amplifier 178, to the recording head 162 to effect recording on the storage track 141.

The "0" value cathode of the counting tube 167 is connected via lead 179 to the gate 158. The discharge will be stepped on to this cathode by the sixth pulse passed by the gate 158. The pulse produced on the lead 179 by the discharge reaching the "0" value cathode switches off the gate 158, and prevents further pulses being applied either to the counting tube 167 or to the gate 168.

When the key 137/6 is released, the relay coil 149 is energized by the charging current of the capacitor 148 through contacts 146/1 to 146/0 and the arm of the stepping switch 155 is shifted to the next contact. The gate 158 is switched off by the carry pulse from the counting tube 167 which is applied to it over lead 179. The output pulse from the gate 153 which switches on the gate 158 is also fed back to the gate 153 via lead 173 to switch this latter gate off. Thus, after the key 137/6 has been released the circuit is ready to record the next input digit, which will be recorded in the storage area 145/2 since the stepping switch 155 has been moved to the next contact position.

The contact 163/0 is connected to a positive source 169. When the contact is shifted to the *b* position by depression of the key 137/0, a positive pulse is applied to the stage 168 over lead 170, which prevents the gate being operated by the pulse on the lead 152. Hence no pulses are recorded in the particular sector selected by the stepping switch 155 when the key 137/0 is depressed.

The arrangements shown in the different embodiments may be combined in other ways. For example, the counter control of the digit recording shown in FIGURE 5 may be combined with the counter control of storage area selection shown in FIGURE 3. Furthermore, the storage tracks and the pulse generator tracks may be on a disc or a loop of tape, for example. A long tape not in the form of a loop, may also be used, in which case tracks 1 and 3 of FIGURE 1 for example, would represent a section of the tape which stores one number, and the same arrangement of storage areas and pulse generator elements would be repeated along the tape to provide storage for other numbers. The heads for sensing the pulse generator elements, and for recording in the storage areas, may be moved during each recording operation, instead of moving the drum, tape, etc.

It will be apparent that the keyboard controlled contacts for digit input may be replaced by relay controlled contacts, electronic gates and similar switching devices.

Figure 7:
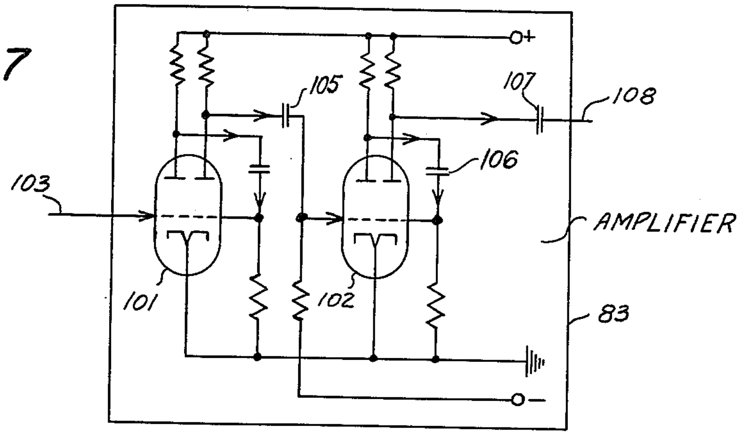
FIGURES 7 to 10 are schematic diagrams of circuits shown in block form in FIGURES 1, 3 and 5.

FIGURES 7 to 10 are schematic circuit diagrams of various circuits shown in block form in FIGURES 1, 3 and 5. FIGURE 7 shows an amplifier such as the amplifier 83 of FIG. 3. The input signals are applied over lead 103 to the left-hand grid of the double triode 101. The amplified signals are fed to the grid of the right-hand half of the triode and are fed from the anode of this section through a capacitor 105 to the grid of the left-hand half of a second double triode 102. The anode of this section is coupled to the grid of the right-hand section through a capacitor 106, and the amplified output signal is taken from the anode of the right-hand section via a capacitor 107 and a lead 108.

Figure 8:
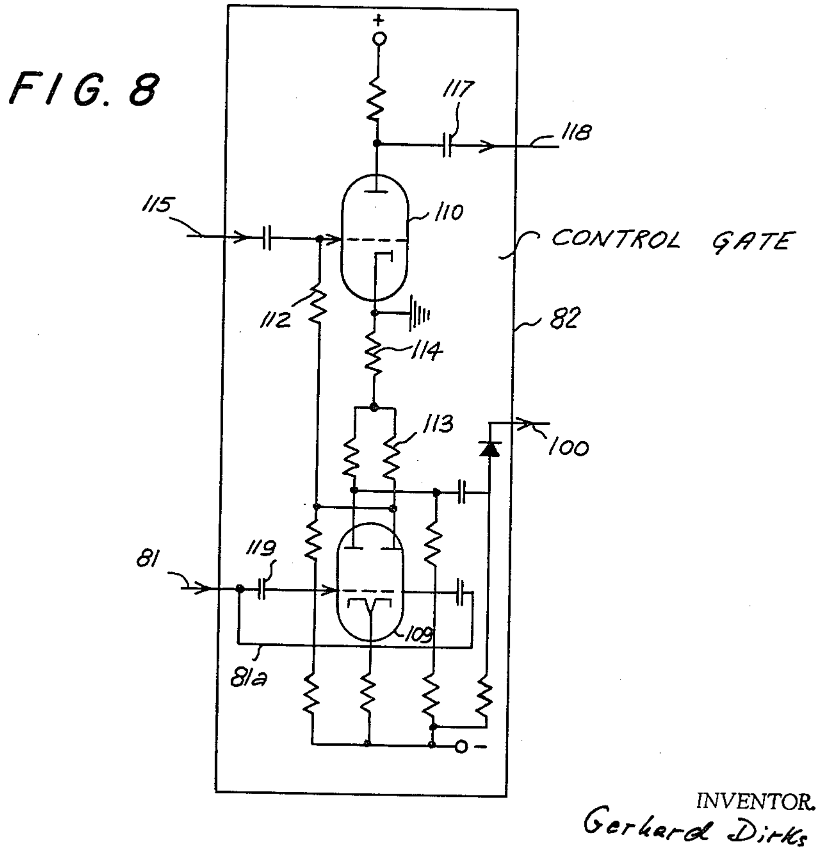

FIGURE 8 shows the circuit of the control gate 82 of FIGURE 3. The signals from the gate 79 are applied over lead 81 and capacitor 119 to one grid of a bistable flip-flop formed by the double triode 109 and the associated resistors. Such signals cause the left-hand triode to be conductive. There is a then relatively small voltage drop across resistors 113 and 114, so that the anode of the right-hand triode is near to ground potential. This anode is connected through a resistor 112 to the grid of a triode 110. Signals applied to the grid of the triode 110 over lead 115 cause the triode to conduct and produce an output signal on lead 118 via capacitor 117. On the other hand, a signal applied over lead 81*a* to the right-hand half of the flip-flop 109 causes this half to conduct. The large voltage drop across the resistors 113 and 114 which results biases the triode 110 so that it is no longer responsive to pulses on the line 115. The anode of the left-hand half of the flip-flop is also connected through a capacitor and a diode to the line 100 so that a pulse appears on this line when the flip-flop is switched from one state to the other.

Figure 9:
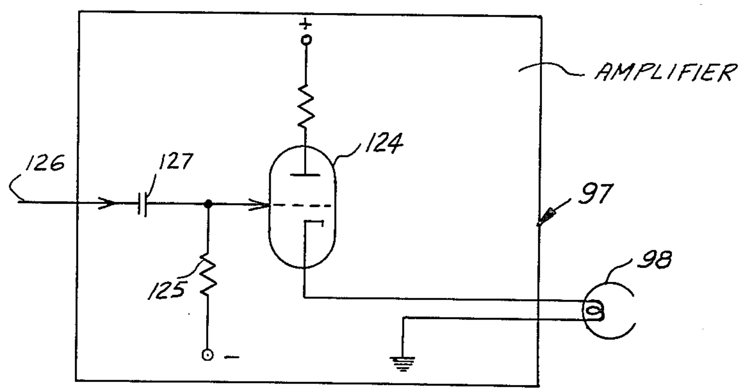

FIGURE 9 shows the circuit of the recording amplifier 97 of FIGURE 3. The recording head 98 is connected as the cathode load of a triode 124. Input signals are applied to the grid of the triode over a lead 126 and capacitor 127. The triode is normally held non-conducting by bias applied to the grid through resistor 125 and is made to conduct by the pulses applied to the line 126.

Figure 10:
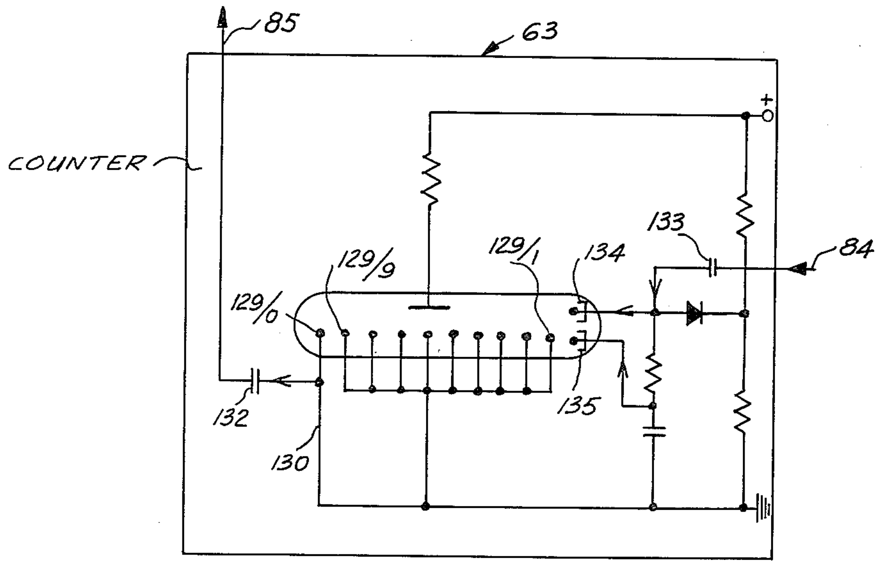

The circuit of the counter 63 of FIGURE 3 is shown in FIGURE 10. It employs a multi-cathode gas-filled discharge counting tube, such as that sold under the commercial reference designation E1T. Cathodes 129/1 to 129/9 are connected directly to ground. The cathode 129/0 is connected through a load resistor 130 to ground. A capacitor 132 couples the cathode 129/0 to the output line 85. The discharge is stepped along the cathodes 129 under the control of guide electrodes 134 and 135 which receive input driving pulses from the lead 84, via a coupling capacitor 133. The counter 167 shown in FIGURE 5 is similar to that shown in FIGURE 10 except that each of the cathodes 129/1 to 129/9 is connected to ground through an individual cathode resistor and the leads 166/1 to 166/9 are connected directly to the cathodes.

It will be appreciated that the amplifiers and gates employed in the other embodiments are generally similar to those described in detail above.

I claim:

1. In a signal storage apparatus, in combination, signal storage means carrying at least one signal storage track for recording signals thereon, a given length of said track being divided longitudinally into a predetermined number of signal storage areas of substantially equal unit length, each area being capable of accommodating a predetermined number of consecutive signal elements; recording means associated with said track for recording said signal elements thereon depending upon application of corresponding pulses to said recording means; pulse generator means including a track member carrying consecutively along a track a plurality of equally spaced pulse generating elements, and a plurality of sensing means equally spaced from each other consecutively along said track member and capable of delivering a pulse whenever a sensing means and a pulse-generating element are moved past one another across a pulse-generating position, said plurality of sensing means including a number thereof equal to said predetermined number of signal elements that can be accommodated in one of said signal storage areas, the number and spacing of said pulse-generating elements differing from the number and spacing of said sensing means in a vernier-like manner so that during the time period required for one of said pulse-generating elements to change from a pulse-generating position relative to one of said sensing means to another pulse-generating position relative to the next consecutive sensing means the other pulse-generating elements assume consecutively pulse-generating positions relative to the other sensing means, respectively, so as to cause during said time period the generation of a sequence of pulses corresponding to said predetermined number of signal elements; means for moving said recording means relative to said signal storage means in direction of said track thereof, and for moving in synchronism therewith said track member relative to said sensing means in such a manner that said time period substantially coincides with the time required for one of said storage areas to be moved a distance corresponding to said unit length thereof relative to said recording means; circuit means for transmitting said pulses from said sensing means to said recording means; control means for selectively controlling the transmission to said recording means of a desired number of pulses out of said sequence thereof generated during any one of said time periods; and means for allocating the recording of said pulses transmitted during consecutive time periods to consecutive selected signal storage areas, respectively.

2. A signal storage apparatus as claimed in claim 1, wherein said signal storage track has at least a magnetizable surface and said recording means is an electromagnetic recording head for magnetically recording said signal elements on said track, and wherein said pulse-generating elements are permanently magnetized members and said sensing means are electromagnetic pick-up heads.

3. A signal storage apparatus as claimed in claim 2, wherein said electromagnetic recording head and said electromagnetic pick-up heads are stationarily mounted, and wherein said signal storage means is a rotatably mounted cylindrical member, said given length of said track corresponding to its circumference, and wherein said track member is a rotatable cylindrical member coupled with said first mentioned cylindrical member for rotation in synchronism with the latter.

4. A signal storage apparatus as claimed in claim 3, wherein said means for allocating the recording of said pulses to consecutive selected signal storage areas comprise at least one magnetic pulse-generating control element arranged on one of said cylindrical members in predetermined positional relation with respect to one of said signal storage areas, electromagnetic pick-up means for sensing said pulse-generating control element, and distributing means responsive to pulses generated in said electromagnetic pick-up means by said pulse-generating control element and cooperating with said circuit means for causing the recording of said pulses transmitted during consecutive time periods to consecutive selected signal storage areas, respectively.

5. A signal storage apparatus as claimed in claim 4, wherein said control means include keyboard means comprising a plurality of key-operable switch means in circuit with said plurality of sensing means for selectively placing any desired number of said sensing means in circuit with said circuit means.

References Cited in the file of this patent

UNITED STATES PATENTS

| | | |
|---|---|---|
| 2,590,091 | Devol | Mar. 25, 1952 |
| 2,611,813 | Sharpless et al. | Sept. 23, 1952 |
| 2,714,843 | Hooven | Aug. 9, 1955 |
| 2,797,402 | Duffey et al. | June 25, 1957 |
| 2,827,623 | Ainsworth | Mar. 18, 1958 |
| 2,850,719 | La Manna | Sept. 2, 1958 |
| 2,850,720 | Oliwa et al. | Sept. 2, 1958 |
| 2,851,676 | Woodcock et al. | Sept. 9, 1958 |